United States Patent [19]
Hofmann et al.

[11] Patent Number: 6,079,537
[45] Date of Patent: Jun. 27, 2000

[54] FRICTION CLUTCH

[75] Inventors: Klaus Hofmann, Leutershausen; Peter Orosz, Grafenrheinfeld, both of Germany

[73] Assignee: Sachs Race Engineering GmbH, Schweinfurt, Germany

[21] Appl. No.: 09/268,576

[22] Filed: Mar. 15, 1999

[30] Foreign Application Priority Data

Mar. 13, 1998 [DE] Germany .......................... 198 10 924
Jun. 5, 1998 [DE] Germany .......................... 198 25 240

[51] Int. Cl.⁷ ................................................ F16D 13/75
[52] U.S. Cl. ............................... 192/70.25; 192/109 R; 192/111 A
[58] Field of Search .................. 192/70.25, 89.23, 192/109 R, 111 A

[56] References Cited

U.S. PATENT DOCUMENTS

| 4,207,972 | 6/1980 | Zeidler ................................ 192/111 A |
| 5,069,322 | 12/1991 | Mizukami et al. .................. 192/70.25 |
| 5,450,934 | 9/1995 | Maucher .............................. 192/70.25 |
| 5,570,768 | 11/1996 | Uenohara et al. ................... 192/70.25 |
| 5,645,154 | 7/1997 | Weidinger et al. ................. 192/70.25 |
| 5,695,036 | 12/1997 | Gochenour et al. ................ 192/70.25 |

FOREIGN PATENT DOCUMENTS

| 1 286 839 | 1/1969 | Germany . |
| 29 20 932 | 11/1979 | Germany . |
| 35 187 81 | 11/1986 | Germany . |
| 42 39 289 | 5/1993 | Germany . |
| 43 06 505 | 9/1993 | Germany . |
| 195 45 972 | 6/1997 | Germany . |
| 2 264 989 | 9/1993 | United Kingdom ............ F16D 13/75 |
| 2 294 301 | 4/1996 | United Kingdom ............ F16D 13/75 |
| 2 327 989 | 2/1999 | United Kingdom ............ F16D 13/75 |

Primary Examiner—Richard M. Lorence
Attorney, Agent, or Firm—Cohen, Pontani, Lieberman & Pavane

[57] ABSTRACT

A friction clutch, in particular multidisk friction clutch, includes a wear compensation device arranged in the pressure force path of a diaphragm spring which forms the principal clutch spring. The wear compensation device is arranged between the diaphragm spring and a pressure plate which is rotatably fixed and axially movably arranged in a clutch housing. The wear compensation device has at least one pair of compensation elements that are axially expandable under the urgency of a spring element. The diaphragm spring is arranged so that it is liftable off of the compensation elements. The pressure plate is prestressed in the release direction by a ventilating spring system having a prestrssing force that is greater than the axial spreading force of the wear compensation device. A ventilating distance-limiting device is active between the pressure plate and the clutch housing and automatically readjusts to a predetermined fixed ventilating distance clearance when wear occurs in the clutch. A compensation distance-limiting stop fixed to the clutch housing limits the spreading movement of the wear compensation device when the ventilating distance clearance of the ventilating distance-limiting device has been used up. The compensation limiting stop is mounted on the compensation element of the wear compensation device which bears against the diaphragm spring.

24 Claims, 3 Drawing Sheets

FRICTION CLUTCH

BACKGROUND OF THE INVENTION

1. Field of the Invention

The invention relates to a friction clutch for motor vehicles.

2. Description of the Related Art

Conventional friction clutches for motor vehicles use a diaphragm spring to generate a force which clamps the clutch disk or friction disk between a pressure plate and a mating plate, which is usually designed as a flywheel. The characteristic force-distance curve of the diaphragm spring is such that the spring force initially rises to a maximum, falls to a minimum, and subsequently increases again as the spring travel of the diaphragm spring increases. To maintain a consistent spring force for each actuation of the clutch, the same section of the force-distance curve of the diaphragm spring should be used each time the clutch is operated. Various ways to compensate for the misalignment of that section of the spring characteristic curve which is used during operation of the friction clutch have been tried. The misalignment usually occurs when friction linings or friction disks of conventional friction clutches become worn such that the operating position of the diaphragm spring changes.

In multidisk clutches such, for example, as those according to German reference DE 195 45 972 A1, which are subjected to high thermal loads in sports car construction, the pressure plate is customarily replaced when the thickness of the set of disks is reduced as they become worn. However, this replacement operation requires a high servicing cost outlay because it entails removing the friction clutch.

Another German reference DE 43 06 505 discloses a single-disk friction clutch in which an automatically operating wear compensation device is arranged in the pressure force path between the diaphragm spring and the pressure plate. The wear compensation device comprises wedges which can be displaced in the circumferential direction of the diaphragm spring by a spring element. The wedges retain their position relative to one another as long as they are pressed against one another by the diaphragm spring. However, in the event of wear to the friction linings of the clutch disk of this clutch, the wedges fill up the increasing distance between the pressure plate and the diaphragm spring by being displaced toward one another under the action of the spring element. Ventilating distance-limiting elements are frictionally locked in an axial bore in the pressure plate. Ventilating springs act on the pressure plate counter to the pressure of the diaphragm spring, but the ventilating distance-limiting elements are arranged in such a manner that they can be displaced counter to the locking force. In the engaged position of the clutch, the ventilating distance-limiting elements butt against the flywheel which is clamping the friction linings between itself and the pressure plate. In the disengaged position, the ventilating distance-limiting elements limit the ventilating distance of the pressure plate by butting against the clutch housing. When wear occurs on the friction linings of the clutch disk, the ventilating distance-limiting members are displaced relative to the pressure plate counter to their locking force. Similar prior art friction clutches with automatically operating compensation device are also known from German references DE 29 20 932 C2, DE 42 39 289 A1 and DE 35 18 781 A1.

Yet another German reference DE-B 1,286,839 discloses an electromagnetically actuable multidisk clutch in which the thickness of the set of friction disks, which is to be pressed against a shoulder of the magnet body by an armature plate of the electromagnet, is balanced by a wear compensation device. The wear compensation device comprises stepped rings which are concentric with respect to the friction disks and rotate under the action of a tension spring as the wear increases to counteract the wear-related reduction in the thickness of the set of disks. The stepped rings are arranged on that side of the set of disks which is remote from the armature plate so that the distance of the armature plate from the poles of the electromagnet is constant. A resilient latching disk is guided on a bolt which extends in the lifting direction of the armature plate. The latching disk is displacable counter to a latching force of predetermined magnitude of the stepped ring which is close to the armature plate. The latching disk rests between two ventilating distance-limiting stops of the armature plate, which is preloaded in the disengagement direction by a compression spring, such that the latching disk limits the ventilating clearance of the armature plate to a predetermined value which is independent of the wear condition of the friction disks.

SUMMARY OF THE INVENTION

The object of the invention is to provide a friction clutch for use in motor vehicles which has a simple design and is not susceptible to undesirable misalignment in operation.

According to an embodiment of the invention, there is disclosed a friction clutch, comprising a first clutch unit comprising a flywheel rotatable about an axis of rotation, a clutch housing fixedly connected to said flywheel, a pressure plate mounted in said clutch housing rotatably fixed and axially movable with respect to said clutch housing, and a diaphragm spring operatively arranged between said clutch housing and said pressure plate for pressing said pressure plate toward said flywheel, a friction disk arrangement clampable between said pressure plate and said flywheel, a second clutch unit rotatable relative to said first clutch unit about said axis of rotation and comprising a hub connectable to a transmission input shaft and at least one disk of said friction disk arrangement, said hub being rotatably fixed to said at least one disk, a ventilating distance-limiting device connected between said pressure plate and said clutch housing and comprising a first limiting element and a second limiting element, said first limiting element being connected to one of said pressure plate and said clutch housing and said second limiting element being connected to said first limiting element such that said second limiting element is axially movable with respect to said first limiting element counter to an adjustment force of a predetermined minimum level, said ventilating distance-limiting device further comprising first and second limiting stops operatively mounted for limiting the axial movement of said second limiting element to a ventilating distance clearance, a ventilating spring system operatively arranged for applying a prestressing force to said pressure plate for urging said pressure plate away from said flywheel, said prestressing force being less than said adjustment force, a wear compensation device arranged between said diaphragm spring and said pressure plate such that said diaphragm spring presses said pressure plate toward said flywheel via said wear compensation device when said friction clutch is in the engaged state, said wear compensation device comprising a spring element connected between first and second compensation elements for urging a relative rotation of said first and second compensation elements and said first and second compensation devices being operatively arranged such that an axial length of said wear compensation device increases in response to the relative rotation such that spring produces an axial spreading force of said wear compensation device, said axial spreading force being less than said prestressing force of said ventilating spring system, said wear compensation device being arranged such that said first compensation element faces said pressure plate and said second compensation element faces said diaphragm spring and said diaphragm spring being movably arranged in said clutch housing such that it is liftable off of said second compensation element, and a compensation distance-limiting stop fixed to said clutch housing for limiting said axial spreading of said first and second compensation elements after the ventilating distance clearance of said ventilating distance-limiting device has been traversed.

In such a friction clutch, which may be designed as a single-disk friction clutch or as a multidisk friction clutch, adapting the spring forces of the ventilating distance-limiting device and the wear compensation device to one another ensures that a predetermined ratio between wear compensation distance of the wear compensation device and ventilating distance of the pressure plate is maintained without this impeding a release movement carried out by the diaphragm spring. In the ventilating-distance-limited disengagement position of the pressure plate, the diaphragm spring can be lifted off the wear compensation device, facilitating adjustment of the clutch release system. Advantageously, the compensation clearance of the wear compensation device is equal to the ventilating clearance. The compensation clearance is defined by the compensation distance-limiting stop when the friction clutch is engaged in the new state of the friction clutch. As a result, a particularly high level of adjustment reliability is achievable.

The compensation elements of the wear compensation device may comprise inclined surfaces so that they spread open in the event of movement relative to one another. However, it is also possible for additional forcing members to be present which are moved in between the compensation elements and cause the compensation elements to spread open. In a configuration which is particularly operationally reliable yet nevertheless simple, the compensation elements are designed as rings which are coaxial with respect to the axis of rotation and rotatable relative to one another about the axis of rotation by the spring element. The rings are supported against one another in the axial direction by a plurality of inclined surfaces which are distributed in the circumferential direction and slope in the circumferential direction. Rings having these characteristics, such, for example, as those which are known in principle from refernece DE-B 1,286,839 ensure that the compensation movement is uniform in the circumferential direction. The inclined surfaces may in this case be stepped or have a continuous inclination. If the inclined surfaces have a continuous inclination, it is preferable that the angle of inclination allows self-locking.

It is advantageous to form the compensation distance-limiting stop using the clutch housing itself such, for example, as by forming a stop edge integrally on this housing. This can be effected relatively easily if the compensation distance-limiting stop is arranged radially outside the circumference of the diaphragm spring in a form in which the ring of the wear compensation device which is axially remote from the pressure plate has at least one stop element which projects radially outward. The axially remote wear compensation device radially engages in an opening in a circumferential wall of the clutch housing via the at least one stop element which forms the compensation distance-limiting stop.

In a preferred embodiment, the first limiting element of the ventilating distance-limiting device is a bolt which extends in the axial direction and to which the second limiting element can be latched in a positively or frictionally locking manner. To keep the tolerances within which the compensation distance-limiting system responds as small as possible, the bolt is advantageously fixed to the pressure plate at least in the adjustment direction of the ventilating distance-limiting device and is guided so that it can move axially on the clutch housing. The bolt may in this case pass through a guide opening in the clutch housing with the second limiting element being arranged on that side of the guide opening which is axially remote from the pressure plate. In this embodiment, the second limiting element may be arranged relatively close to the guide opening to reduce the influence of any tilting movements of the bolt.

In a manner known per se, the ventilating spring system may comprise tangential leaf springs which also take care of the rotationally fixed but axially displaceable guidance of the pressure plate on the clutch housing. However, as an alternative or in addition to the tangential leaf springs, the ventilating spring system may also comprise a compression spring clamped between the clutch housing and the second limiting element. This arrangement of the compression spring places the bolt under tensile load, preventing the bolt from becoming jammed in its guides in an undesirable manner. Both helical compression springs and, in particular, sets of spring washers, are suitable.

The second limiting element may comprise an annular, resilient latching disk which surrounds the bolt having an outer circumference that engages axially between the limiting stops. In this embodiment, it is possible to provide large-area stop surfaces even when the dimensions of the latching disk are small, and in addition the latching disk can be used as an abutment for the compression spring which serves as the ventilating spring system.

The latching disk is expediently arranged in a widened section of the guide opening which axially adjoins the guide opening in the clutch housing. The limiting stop which is remote from the pressure plate comprises a removable retaining ring in this widened section. In this specific embodiment, the components involved in the latching action are accommodated so that they are protected but are nevertheless easily fitted and removed.

The latching disk may be provided with clamping members which lock frictionally on the bolt but allow the latching disk to move axially on the bolt if the friction force is overcome. To set a defined latching force, however, the bolt preferably has a plurality of latching grooves in which the latching disk engages by resilient pawl teeth. In the case of exemplary embodiments with a frictionally locking latching, this may be in the form of a clamping sleeve.

Automatic wear compensation devices as explained above have a maximum adjustment distance which is limited by their design, in particular by the maximum spreading travel of the compensation elements. The maximum wearing volume of the friction linings or friction disks is generally greater than this maximum compensation distance or can be increased without major technical problems.

A further object of the invention is to show how the wearing volume in a friction clutch with an automatically acting wear compensation device can be increased with comparatively little structural outlay.

This object is achieved by a friction clutch, comprising a first clutch unit comprising a flywheel rotatable about an axis of rotation, a clutch housing fixedly connected to said flywheel, a pressure plate mounted in said clutch housing rotatably fixed and axially movable with respect to said clutch housing, and a diaphragm spring operatively arranged between said clutch housing and said pressure plate for pressing said pressure plate toward said flywheel, a friction disk arrangement clampable between said pressure plate and said flywheel, a second clutch unit rotatable relative to said first clutch unit about said axis of rotation and comprising a hub connectable to a transmission input shaft and at least one disk of said friction disk arrangement, said hub being rotatably fixed to said at least one disk, a wear compensation device arranged between said diaphragm spring and said pressure plate such that said diaphragm spring presses said pressure plate toward said flywheel via said wear compensation device, said wear compensation device comprising first and second compensation elements relatively rotatable relative to each other for expanding an axial length of said wear compensation device to compensate for wear related change in axial dimension of at least one of said pressure plate, said flywheel, and said friction disk arrangement, and a blocking device for blocking an axial expansion of said wear compensation device when an amount of axial spreading of said wear compensation device reaches a predetermined axial compensation travel, said predetermined axial compensation travel comprising a distance that is less than an operationally maximum permissible wear-related change in the combined axial dimensions of said pressure plate, said flywheel, and said friction disk arrangement.

The blocking device advantageously comprises stop means which limit the extent to which the compensation elements can spread in the axial direction relative to one another. The stop means may comprise axially acting stops which directly limit the axial spreading action of the compensation elements. However, since the axial spreading movement generally involves the compensation elements being displaced relative to one another in a different direction from this axial spreading movement, the stop means may also act in this different direction. The compensation elements may be rings which are coaxial with respect to the axis of rotation that are rotatable relative to one another about the axis of rotation by a spring element and are supported against one another in the axial direction by a plurality of inclined surfaces which are distributed in the circumferential direction and slope in the circumferential direction. In this specific embodiment, the stop means may directly limit the axial spreading movement of the two rings relative to one another or may limit the relative rotational movement of these rings in the circumferential direction.

The invention is suitable in particular for use in a multidisk clutch in which the friction disk arrangement has a plurality of inner disks, which are held in external toothing on the hub in such a manner that they are rotationally fixed but axially movable and which interact with at least one outer disk, which is held in internal toothing of the clutch housing in such a manner that it is rotationally fixed but axially movable. Of course, the pressure plate may also be connected to the clutch housing via the internal toothing of the latter in such a manner that it is rotationally fixed but axially movable. The inner disks and/or the at least one outer disk and/or the pressure plate may be components which at least in part comprise carbon material and therefore withstand even comparatively high operating temperatures.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
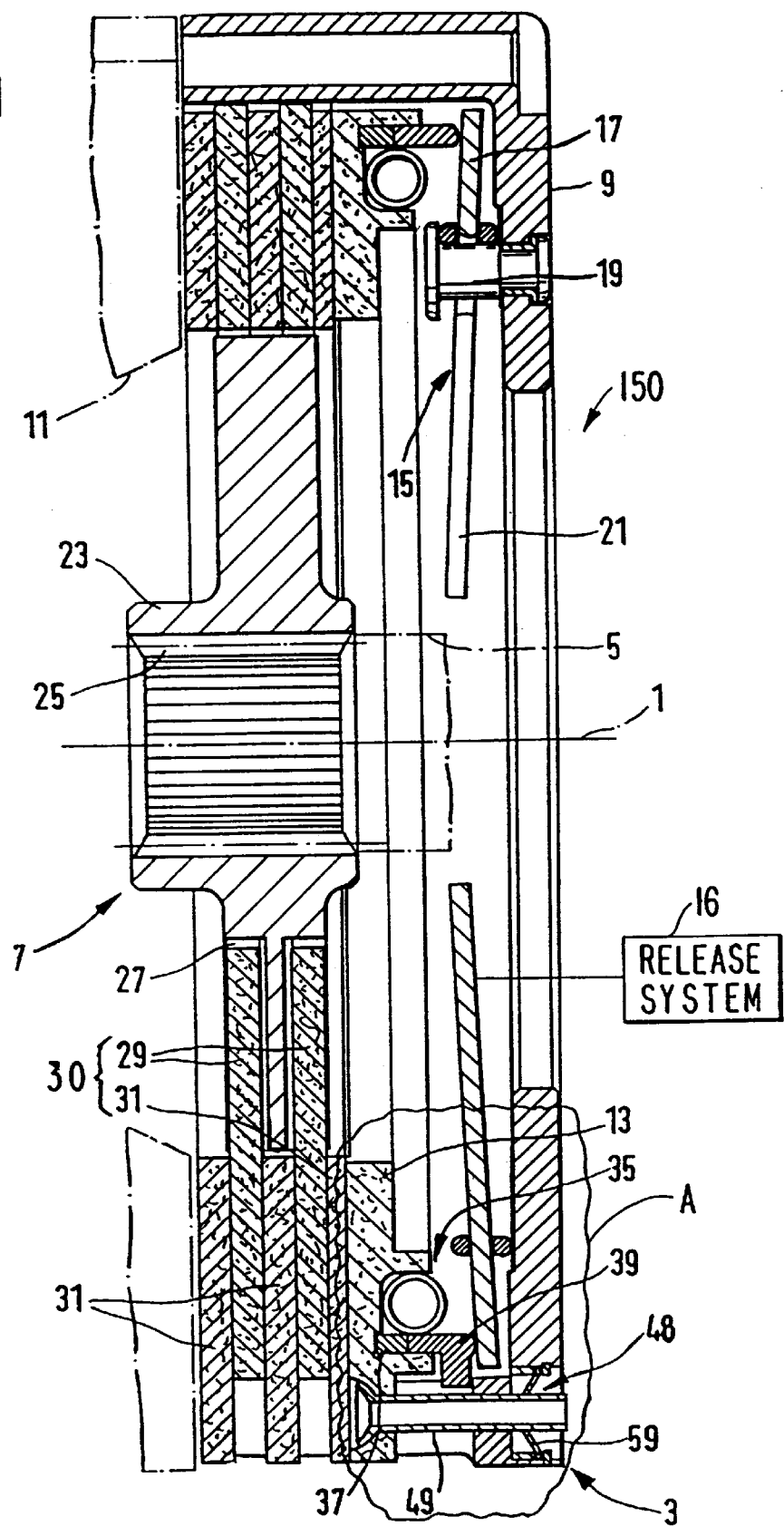
FIG. 1 is a longitudinal sectional view of a multidisk friction clutch for a motor vehicle according to an embodiment of the invention.

A multidisk friction clutch 150 according to an embodiment of the present invention comprises a first clutch unit 3 connectable with a crankshaft (not shown in more detail) of an internal combustion engine of the motor vehicle for rotating with the crankshaft about an axis of rotation 1. A second clutch unit 7 of the friction clutch is rotatably mounted coaxially with the first and is connected via a rotationally fixed and axially movable connection to an input shaft 5 of a motor vehicle transmission which lies downstream in the torque transmission path. As explained in more detail below, the first and second clutch units 3, 7 are in frictional engagement with one another. The frictional engagement is releasable by a release system 16 (shown schematically in FIG. 1).

The first clutch unit 3 comprises a clutch housing 9 which is attached via a connection such, for example, as a screw connection to a flywheel 11 which is fixedly connectable to the crankshaft (not shown). A pressure plate 13 is arranged within the clutch housing 9 such that it is rotationally fixed and axially movable with respect to the clutch housing 9 and is prestressed toward the flywheel 11 by a diaphragm spring 15 which is tiltably supported on the clutch housing 9. An inner circumference of an annular disk part 17 of the diaphragm spring 15 is mounted on the clutch housing 9 with the aid of a plurality of spacer bolts 19 which are arranged on a tilting circle of the diaphragm spring 15 such that the diaphragm spring 15 is rotationally fixed but can tilt with respect to the housing. In addition, the diaphragm spring 15 has tongues 21 which protrude radially inward for engagement with the release system 16.

The second clutch unit 7 comprises a hub 23 with an internal toothing 25 for effecting a rotationally fixed connection to the transmission input shaft 5 and an external toothing 27 on which a plurality of inner disks 29, in this case two inner disks 29, are guided in a rotationally fixed but axially movable manner. The inner disks 29 are supplemented by outer disks 31 to form a stack of disks 30 in the friction clutch 150. The outer disks 31 are arranged on an internal toothing of the clutch housing 9 so that the outer disks 31 are rotationally fixed and axially displaceable with respect to the clutch housing 9. One of the outer disks 31 may be fixedly connected to the pressure plate 13 as shown in the bottom part of FIG. 1 so that the pressure plate 13 and that one outer disk are one unit. The inner disks 29 and the outer disks 31 may comprise a carbon material in order to improve their strength at high temperatures. If the pressure plate 13 contains and integral outer disk 31, the pressure plate 13 may also comprise a carbon material.

Wear to the inner and outer disks 29, 31 causes the axial height of the stack of disks 30 to decrease. As the axial height of the stack of disks 30 changes, the installed position of the diaphragm spring 15 changes accordingly. During any point in time, the diaphragm spring operates within a section of the characteristic force-distance curve of the diaphragm spring. As the operating position of the diaphragm spring changes, the section of the characteristic force-distance in which the diaphragm spring 15 operates also changes. This change in the operating section of the characteristic force-distance curve of the diaphragm spring 15 affects the clutch characteristics. To maintain the original installed position of the diaphragm spring 15 at a constant position despite wear-related changes in the height of the stack of disks 30, a wear compensation device 35 is arranged in the force transmission path between the diaphragm spring 15 and the pressure plate 13. The wear compensation device 35 opens in the axial direction in response to wear to the stack of disks 30 to compensate for the wear-related reduction in the height of the stack of disks 30. Accordingly, the diaphragm spring 15 maintains its appropriate installed position as in the new wear state of the clutch.

Figure 2:
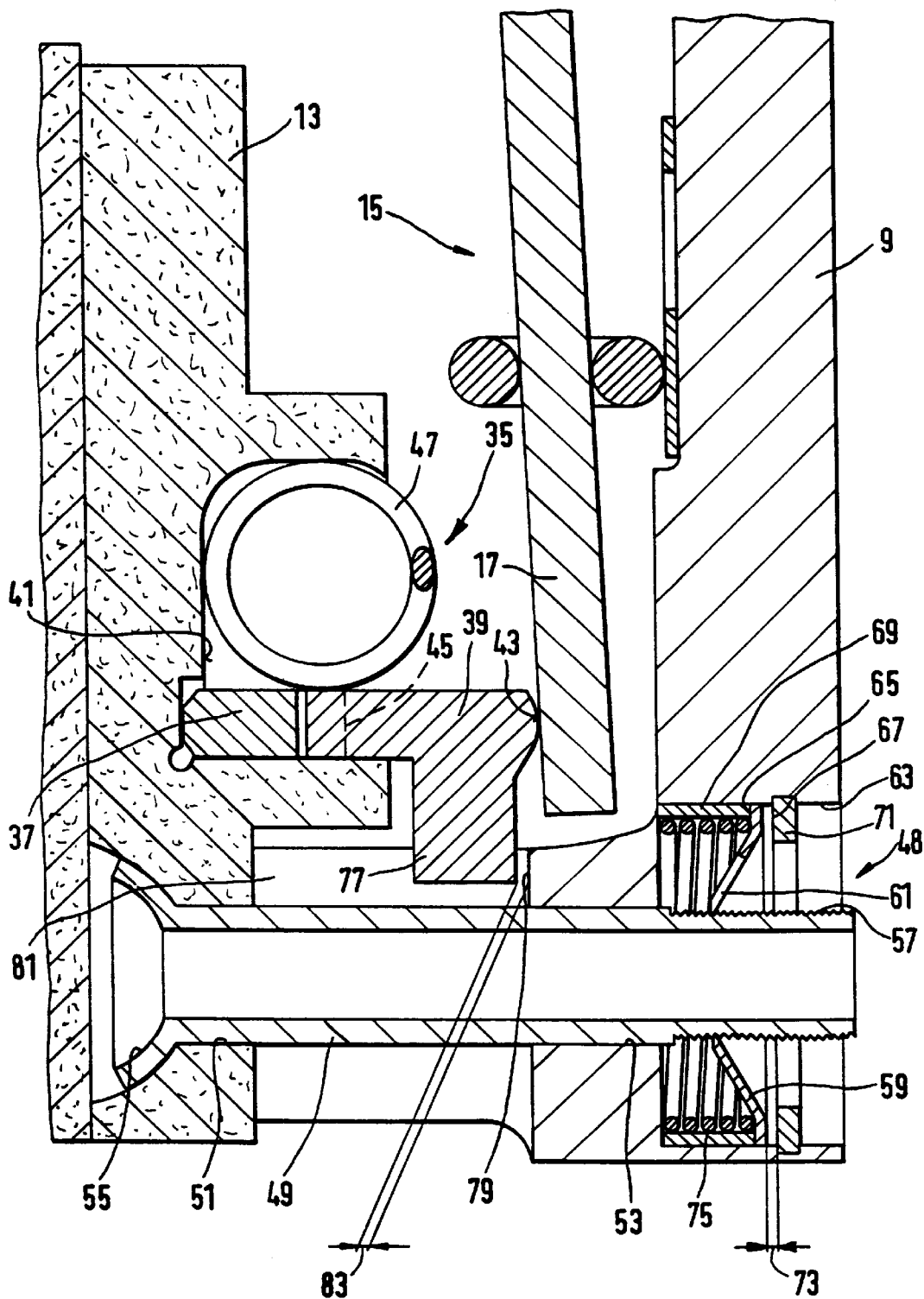
FIG. 2 is a detailed view of enclosed area A of the friction clutch in FIG. 1.

The wear compensation device 35 comprises first and second compensation rings 37, 39 which are coaxial with respect to one another and with respect to the axis of rotation 1. Referring to FIG. 2, the two compensation rings 37, 39 are guided radially in an annular groove 41 in the pressure plate 13 which opens toward the diaphragm spring 15. The first compensation ring 37 is closer to the pressure plate 13 and is supported directly against the pressure plate 13. The second compensation ring 39 is remote from the pressure plate 13 and includes a support bead 43 in a region proximate an outer circumference of the annular disk part 17 of the diaphragm spring 15. The support bead 43 loosely supports the diaphragm spring 15 such that the diaphragm spring 15 may be lifted off the support bead 43 during a disengagement of the friction clutch 150. The first and second compensation rings 37, 39 axially bear against one another via inclined surfaces 45 which are sloped in the same circumferential direction. The axial length of the compensation device 35 increases when the compensation rings 37, 39 are rotated relative to one another about the axis of rotation 1. A tension spring 47 such, for example, as a helical tension spring is mounted in and guided in the circumferential groove 41. One end of the tension spring is attached to the first compensation ring 37 and the other end of the tension spring is attached to the second compensation ring 39 so that the first and second compensation rings 37, 39 are circumferentially prestressed in the direction which causes the axial length of the wear compensation device 35 to increase. The inclined surfaces of the first and second compensation rings 37 and 39 may be stepped or have an angle of inclination which ensures self-locking such that a load exerted on the first and second compensation rings 37, 39 by the diaphragm spring 15 does not cause a displacement of the first and second compensation rings 37, 39 counter to the displacement-assisting action of the helical tension spring 47. The self-locking characteristic prevents displacement of the wear compensation device 35 in the engaged position of the friction clutch 150. The wear-related reduction in the height of the stack of disks 30 is only compensated for when the load on the compensation device 35 from the pressure of the diaphragm spring 15 is relieved such, for example, as when the clutch is released.

To prevent uncontrolled displacement of the wear compensation device 35 which is not related to wear and is therefore undesirable, the compensation distance of the wear compensation device 35 and a ventilating distance of the pressure plate 13 are limited to clearances of equal sizes.

The ventilating clearance of the pressure plate 13 is defined by a ventilating distance-limiting device 48. The ventilating distance-limiting device 48 comprises a tension bolt 49 arranged radially outside the diaphragm spring 15 extending axially parallel to the axis of rotation 1. The tension bolt 49 passes movably through guide bores 51, 53 in the pressure plate 13 and the clutch housing 9, respectively, which are aligned with one another. A head 55 of the tension bolt 49 engages behind a side of the pressure plate 13 facing the flywheel 11, thereby fixing the tension bolt in the axial direction toward the clutch housing 9. On a side of the guide bore 53 remote from the pressure plate 13, the tension bolt 49 has a plurality of closely adjacent circumferential grooves 57. A latching disk 59 surrounds the tension bolt 49 and includes pawl teeth 61 which are set at an angle to the pressure plate 13 for engaging one of the circumferential grooves 57. The latching disk 59, which is latched to one of the circumferential grooves 57, rests in an axially displaceable manner in a cutout 63 in the clutch housing 9. The cutout 63 is widening of a side of the guide bore 53 remote from the pressure plate 13. Inner and outer ventilating distance-limiting stops 65, 67, which are annularly shaped, are mounted in the cutout 63 and a radial outer edge of the latching disk 59 engages between the inner and outer annular ventilating distance-limiting stops 65, 67. The inner stop 65 is adjacent to the guide bore 53 and comprises a sleeve 69 fitted into the cutout 63. The outer stop 67 is formed by a removable retaining ring 71. The inner and outer stops 65, 67 limit the movement clearance of the latching disk 59 and therefore, via the tension bolt 49, limit the ventilating clearance of the pressure plate 13 to a ventilating clearance distance 73. A compression spring 75 is mounted on the tension bolt 49 such that it surrounds the tension bolt and is arranged between the latching disk 59 and the end of the cutout 63 that is adjacent to guide bore 53. The compression spring 75 prestresses the latching disk 59 and therefore the pressure plate 13 in the release direction with a ventilating force of predetermined magnitude such that the clutch housing 9 is urged toward the pressure plate 13.

To limit the compensation clearance distance 83 of the wear compensation device 35, the second compensation ring 39 which is remote from the pressure plate 13 and bears against the diaphragm spring 15 includes a projection 77 which protrudes radially outward and interacts with a compensation distance-limiting stop 79 on the clutch housing which faces axially toward the flywheel 11. In the exemplary embodiment illustrated, the compensation distance-limiting stop 79 is formed by an opening 81 in the circumferential wall of the clutch housing which surrounds the radial outer side of the diaphragm spring 15. In the new state of the engaged clutch the disk stack 30 does not exhibit any wear and the projection 77 is at a compensation clearance distance 83 from the compensation distance-limiting stop 79 which is equal to the ventilating clearance distance 73 of the ventilating distance-limiting device 47.

(FIGS. 1 and 2 show a single ventilating distance-limiting device 48. However, it is also possible for a plurality of these devices to be distributed over the circumference of the friction clutch 150 to achieve a uniform distribution of the ventilating force. As an alternative to the positively locking latching of the latching disk 59 explained above, a frictionally locking latching of the latching disk 59 on the tension bolt 49 may also be used. Regardless of the type of connection between the latching disk 59 and the tension bolt 49, the compression springs 75 place the tension bolts 49 under tensile load which considerably reduces any tendency of the tension bolts to become jammed in the guide bore 53. Incorporating the annular grooves 57 and the latching disk 59 in the cutout 63 improves the protection against contamination for these components.

FIG. 1 shows only one radial projection 77. However, the second compensation ring 39 may also have a plurality of such projections distributed over its circumference.

To prevent the wear compensation device 35 from being displaced in an undesirable manner during operation of the motor vehicle, the ventilating springs 75 are dimensioned such that the sum of the forces exerted on the wear compensation device 35 by the ventilating spring 75 via the pressure plate 13 is greater than the axial spreading force component exerted on the first and second compensation rings 37, 39 by the tension spring 47.

The latching force of the latching disk 59 is the displacement forces which is required to displace the latching disk 59 along the tension bolt 49 and is designed to have a minimum value which is greater than the sum of the compressive forces exerted by the ventilating spring or springs 75. This ensures that the ventilating springs 75 do not displace the latching disk 59 along the tension bolt 49 but press the first and second compensation rings 37, 39 against the diaphragm spring 15 with a sufficiently great force such that it is impossible for the helical tension spring 47 to displace the compensation rings 37, 39 with respect to one another and thus spread them apart. Accordingly, the wear compensation device 35 is not displaceable while the second compensation ring 39 is bearing against the diaphragm spring 15, which is the normal position of the second compensating ring 39 at least at the start of the operation of releasing the friction clutch and before the projection 77 reaches the compensation distance-limiting stop 79.

The clutch operates as follows: A new friction clutch 150 with no wear on the stack of disks 30 rests in the engaged state. To release the clutch, the tongues 21 of the diaphragm spring 75 are pressed toward the flywheel 11, and correspondingly the load on the pressure plate 13 is relieved as the annular disk part 17 of the diaphragm spring 15 correspondingly moves away from the flywheel. Due to the prestress from the forces of the ventilating spring 75 which act on the pressure plate 13 via the latching disk 59 and the tension bolt 49, the wear compensation device 35 remains in contact with the diaphragm spring 15 which prevents the first and second compensation rings 37, 39 from spreading apart as the annular disk part 17 of the diaphragm spring 15 of the diaphragm spring 15 moves away from the flywheel 11. After the annular disk part 17 moves a distance such that the compensation clearance distance 83 and the ventilating clearance distance 73, which are of equal size if no wear has taken place, have been used up, further movement of the annular disk part 17 of the diaphragm spring 15 away from the flywheel 11 will lift the diaphragm spring 15 off the support bead 43 without the wear compensation device 35 being able to move. At this position, the compensation device 35 is held in place because the projection 77 rests against the compensation distance limiting stop 79.

If wear has reduced the axial height of the stack of disks 30 when the friction clutch is engaged, the pressure plate 13 moves closer to the flywheel 11. In the engaged state, the pressure of the diaphragm spring 15 on the wear compensation device 35 is sufficient to displace the pressure plate 13 and the tension bolt 49 via the wear compensation device 35 toward the flywheel 11 counter to the latching force of the latching disk 59. When the friction clutch 150 is engaged and wear has occurred, the pressure exerted by the diaphragm spring 15 prevents displacement of the wear compensation device 35.

However, during a disengagement operation after the occurrence of wear in the disk stack 30, the ventilating clearance distance 73 of the ventilating distance-limiting device 48 is used up before the projection 77 of the wear compensation device 35 bears against the stop 79. Once the ventilating clearance distance 73 is used up, the prestressing force from the ventilating springs 75 is absent thereby allowing the helical tension spring 47 to spread the first and second compensation rings 37, 39 apart, specifically until the projection 77 again bears against the ventilating distance-limiting stop 79. The wear compensation device 35 then cannot be displaced further, even if the diaphragm spring 15 is subsequently lifted off the compensation ring 39. After the displacement of the wear compensation device 35, the wear compensation clearance distance 83 and the ventilating clearance distance 73 are again equal. In addition, when the friction clutch 150 is reengaged subsequent to the displacement of the wear compensation device 35, the diaphragm spring 15 again returns to the original position before the occurrence of the wear.

Figure 3:
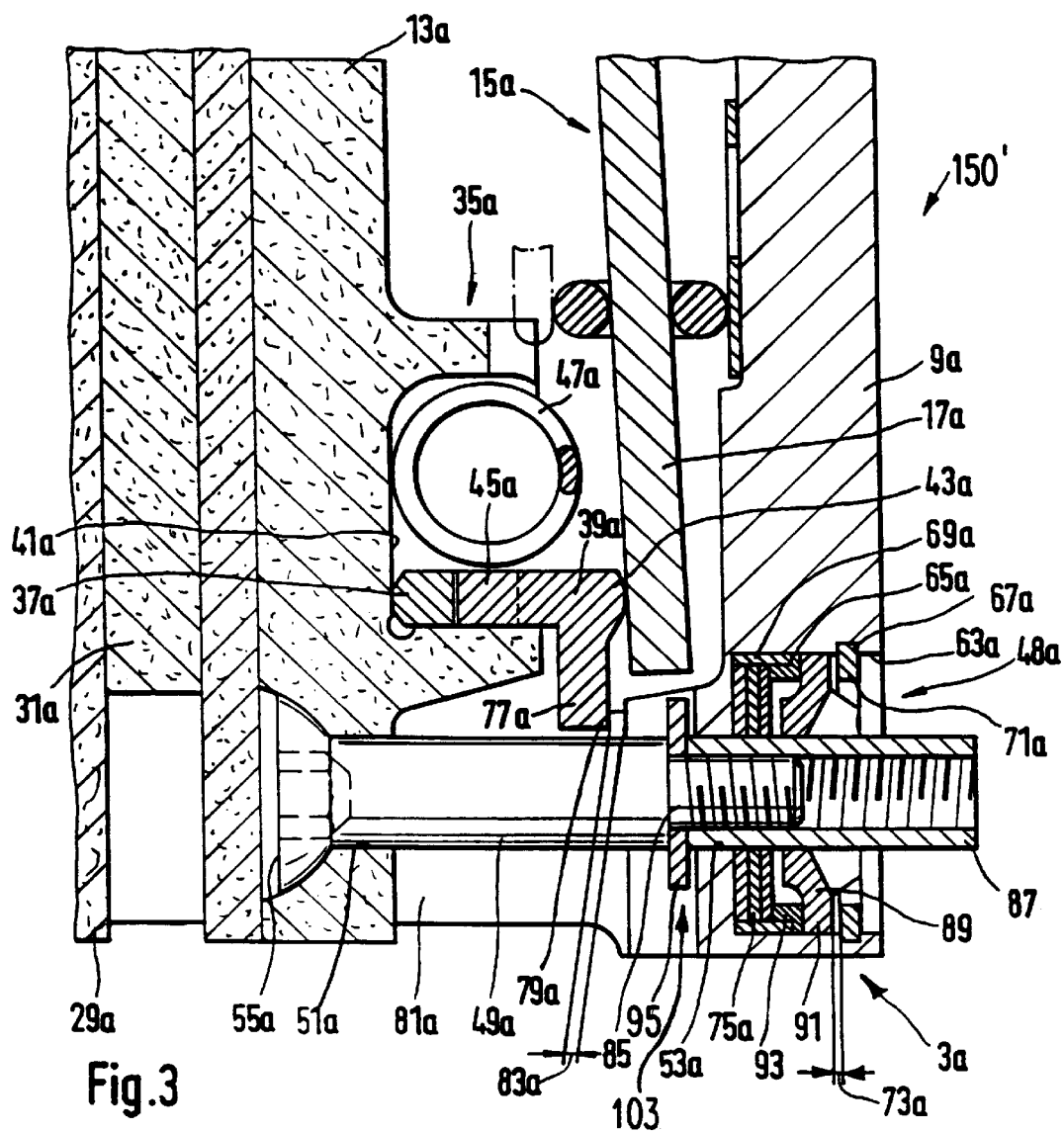
FIG. 3 is a longitudinal sectional view of a portion of another embodiment of a multidisk friction clutch showing the area of a ventilating distance device and a wear compensation device having a blocking device.
Figure 4:
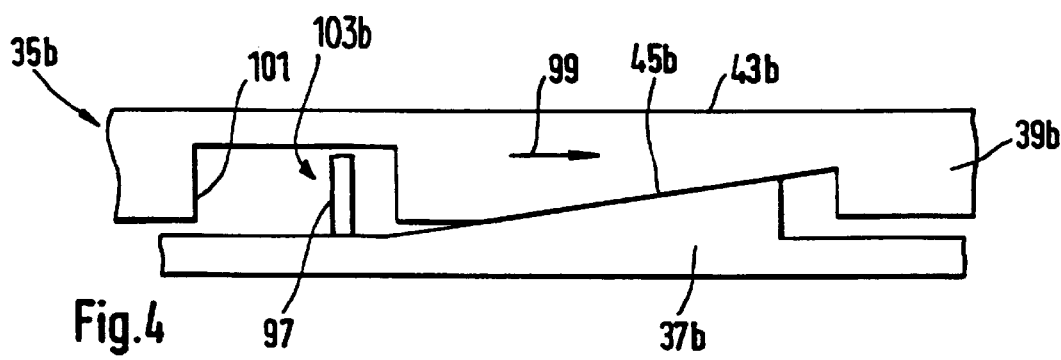
FIG. 4 shows a portion of the wear compensation device of FIG. 3.

With reference to FIGS. 3 and 4, the following text explains different embodiments of the friction clutch 150. Components which have identical functions are provided with the same reference numerals as the components explained above, but with the addition of a letter for purposes of differentiation. Reference is made to the description given above in order to explain the structure and method of operation of the friction clutch.

The embodiment of a friction clutch 150' shown in FIG. 3 differs from the embodiment shown in FIGS. 1 and 2 in that the design of the ventilating distance-limiting device 48a is different and in that it includes an additional blocking device (explained in more detail below) for the wear compensation device 35a, via which the maximum usable wearing volume of the friction clutch can be increased. The axis of rotation 1, input shaft 5, second clutch unit 7, flywheel 11, spacer bolts 19, tongues 21, hub 23, internal toothing 25, and external toothing 27 are not shown in FIG. 3 but are nevertheless present as shown in FIGS. 1 and 2.

In the embodiment of FIG. 3, the tension bolt 49a of the ventilating distance-limiting device 48a is of two-part design and includes a clamping bolt 87 that is screwed onto an end of a threaded bolt 85 which is remote from the pressure plate 13a. The clamping bolt 87 comprises the form of a sleeve and a clamping bush 89 is frictionally latched on an exterior surface of the clamping bolt 87. An annular collar 91 provided around the outer circumference of the clamping bush 89 engages radially between inner and outer annular ventilating distance-limiting stops 65a and 67a. The inner stop 65a is adjacent to the pressure plate 13a and comprises a sleeve 69a fitted into the cutout 63a proximate the guide bore 53a. The outer stop 67a is formed by a removable retaining ring 71a in the cutout 63a. An angle ring 93 having a radially extending limb and an axially extending limb is arranged in the cutout 63a. In addition to the annular collar 91, the radially extending limb of the angle ring 93 also projects into the annular gap formed between the inner and outer stops 65a and 67a. A plurality of spring washers 75a surrounds the clamping bolt 87 and prestresses the clamping sleeve 89 and the pressure plate 13a in the release direction with a ventilating force of predetermined magnitude. The plural spring washers 75a are clamped between the axially extending limb of the angle ring 93 and the bottom of the cutout 63a. The ventilating force of the set of spring washers 75a is dimensioned such that the sum of its forces exerted on the wear compensation device 35a via the pressure plate 13a is greater than the axial spreading force component exerted on the compensation rings 37a, 39a by the helical tension spring 47a.

The latching clamping forces of the clamping sleeve 89 are the displacement forces which are required to displace the clamping sleeve 89 along the clamping bolt 87. These latching clamping forces have a minimum value which is greater than the sum of the compressive forces exerted by the plural spring washers 75. This arrangement ensures, as has already been explained above, that the clamping sleeve 89 is not displaceable along the clamping bolt 87 by the plural spring washers 75. However, the plural spring washers 75 do press the compensation rings 37a, 39a against the diaphragm spring 15a with a sufficiently great force, thus preventing the helical tension spring 47a from displacing the first and second compensation rings 37a, 39a with respect to one another and thus spread them apart. In other words, the wear compensation device 35a cannot be displaced while the compensation ring 39a is bearing against the diaphragm spring 15a, as is the case at least at the start of the operation of releasing the friction clutch and before the projection 77a reaches the compensation distance-limiting stop 79a.

The axial height of the inclined surfaces 45a limits the maximum axial spreading travel of the first and second compensation rings 37a, 39a to a maximum wear compensation distance. As explained above with reference to FIGS. 1 and 2, when the wear compensation device 35a has axially expanded by a distance equal to the maximum wear compensation distance, the friction clutch has reached the end of its operating service life. In general, the wearing volume of the friction linings or friction disks of a friction clutch is usually limited to this maximum wear compensation distance which is determined by the wear compensation device. In the embodiment shown in FIG. 3, a stop disk 95 is mounted on the tension bolt 49a. The stop disk 95 is screwed on with the aid of the clamping bolt 87, on a side of the projection 77 of the compensation ring 39a facing the diaphragm spring 15a. In the new state of the clutch, the axial distance between the stop disk 95 and the projection 77a is equal to the maximum compensation distance which the wear compensation device 35a can compensate for in total. When compensating for this maximum compensation distance, the stop ring 95 butts against the projection 77a and blocks any further axial spreading of the first and second compensation rings 37a, 39a. When the stop ring 95 abuts against the projection 77a, the friction clutch 150' of FIG. 3 behaves like a conventional friction clutch without an automatic compensation device. If the friction linings or in this case friction disks 29a, 31a include an increased wearing volume beyond the maximum compensation distance, this additional wearing volume may be utilized by allowing the diaphragm spring 15a to change position along its characteristic force-distance curve in response to wear of the function disks. The full wearing volume of the friction linings or friction disks may thereby be increased or may be utilized better despite the maximum compensation distance of the wear compensation device 35a being comparatively short. The working point of the diaphragm spring 15a within its characteristic curve is selected such that the diaphragm spring 15a, even when the axial compensation distance of the wear compensation device 35a has been fully utilized for compensation purposes, is able to apply the required axial forces for complete clutch engagement even in the pressure plate engagement position which due to wear has been displaced toward the flywheel.

In the embodiment shown in FIG. 3, a blocking device 103 comprising stop means including a stop disk 95 is provided which directly limit the axial spreading movement of the first and second compensation rings 37a, 39a in the axial direction. As shown in the embodiment in FIG. 4, the axial spreading movement may also be limited by a blocking device 103b for blocking the rotational movement of the first and second compensation rings 37b, 39b. The first and second compensation rings 37b, 39b comprise inclined surfaces 45b arranged such that the axial length of the first and second compensation rings 37b, 39b expands when the second compensation ring 39b moves in a spreading direction 99 with respect to the first compensation ring 37b. The blocking device 103b comprises a first stop 97 on the second compensation ring 37b. The first stop 97 comprises a pin. The blocking device 103b also includes a stop 101 that lies on the first compensation ring 39b downstream with respect to the spreading direction 99 with respect to the first stop 97. After the total available axial compensation distance of the first and second compensation rings 37b, 39b (which can rotate relative to one another) has been used for compensation purposes, the stops 97 and 101 butt against one another the wear compensation device 35b is blocked from further rotation and thereby from further axial expansion. The blocking device 103b in accordance with FIG. 4 may also be used instead of the blocking device 103 shown in FIG. 3. Both blocking devices 103, 103b may also be used in the embodiment shown in FIGS. 1 and 2. However, the blocking devices 103, 103b shown in FIGS. 3 and 4 may also be used with wear compensation devices of entirely different designs, specifically even if there is no ventilating distance-limiting device provided.

In the embodiments of FIGS. 1–4, the wear compensation device 35, 35a is arranged between the diaphragm spring 15, 15a and the pressure plate 13, 13a in the supporting force path of the diaphragm spring. Alternatively, the wear compensation device 35, 35a including the associated blocking device, may also be provided between the diaphragm spring and the clutch housing in the supporting force path of the diaphragm spring.

The invention is not limited by the embodiments described above which are presented as examples only but can be modified in various ways within the scope of protection defined by the appended patent claims.

We claim:

1. A friction clutch, comprising:

a first clutch unit comprising a flywheel rotatable about an axis of rotation, a clutch housing fixedly connected to said flywheel, a pressure plate mounted in said clutch housing rotatably fixed and axially movable with respect to said clutch housing, and a diaphragm spring operatively arranged between said clutch housing and said pressure plate for pressing said pressure plate toward said flywheel;

a friction disk arrangement clampable between said pressure plate and said flywheel;

a second clutch unit rotatable relative to said first clutch unit about said axis of rotation and comprising a hub connectable to a transmission input shaft and at least one disk of said friction disk arrangement, said hub being rotatably fixed to said at least one disk;

a ventilating distance-limiting device connected between said pressure plate and said clutch housing and comprising a first limiting element and a second limiting element, said first limiting element being connected to one of said pressure plate and said clutch housing and said second limiting element being connected to said first limiting element such that said second limiting element is axially movable with respect to said first limiting element counter to an adjustment force of a predetermined minimum level, said ventilating distance-limiting device further comprising first and second limiting stops operatively mounted for limiting the axial movement of said second limiting element to a ventilating distance clearance;

a ventilating spring system operatively arranged for applying a prestressing force to said pressure plate for urging said pressure plate away from said flywheel, said prestressing force being less than said adjustment force;

a wear compensation device arranged between said diaphragm spring and said pressure plate such that said diaphragm spring presses said pressure plate toward said flywheel via said wear compensation device when said friction clutch is in the engaged state;

said wear compensation device comprising a spring element connected between first and second compensation elements for urging a relative rotation of said first and second compensation elements and said first and second compensation devices being operatively arranged such that an axial length of said wear compensation device increases in response to the relative rotation such that spring produces an axial spreading force of said wear compensation device, said axial spreading force being less than said prestressing force of said ventilating spring system;

said wear compensation device being arranged such that said first compensation element faces said pressure plate and said second compensation element faces said diaphragm spring and said diaphragm spring being movably arranged in said clutch housing such that it is liftable off of said second compensation element; and a compensation distance-limiting stop fixed to said clutch housing for limiting said axial spreading of said first and second compensation elements after the ventilating distance clearance of said ventilating distance-limiting device has been traversed, wherein said second compensation element facing said diaphragm spring is displaced to a disengaged position abutting said compensation distance-limiting stop on said clutch housing each time said diaphragm spring is lifted off of said second compensation element.

2. The friction clutch of claim 1, wherein said compensation distance-limiting stop allows a compensation clearance of said wear compensation device via the axial spreading of said first and second compensation elements equal to said ventilating distance clearance when said friction clutch is engaged and is in a new state.

3. The friction clutch of claim 1, wherein said first and second compensation elements comprise first and second rings coaxially arranged with respect to said axis of rotation and rotatable relative to one another by the urgency of said spring element, each said first and second rings comprising a plurality of inclined surfaces distributed circumferentially and sloping with respect to a circumferential direction, said plural inclined surfaces of said first ring facing and abutting said plural inclined surfaces of said second ring.

4. The friction clutch of claim 3, wherein the compensation distance-limiting stop is arranged radially outside an outer circumference of said diaphragm spring.

5. The friction clutch of claim 3, wherein said second ring is axially remote from said pressure plate and comprises a stop element projecting radially outward and engaging an opening in said compensation distance-limiting stop.

6. The friction clutch of claim 1, wherein said first limiting element of said ventilating distance-limiting device comprises an axially extending bolt and said second limiting element is latchable to said first limiting element via one of a positive locked or frictional locked connection.

7. The friction clutch of claim 6, wherein said bolt is fixed to said pressure plate in an adjustment direction of said ventilating distance-limiting device and is axially movably mounted on said clutch housing.

8. The friction clutch of claim 7, wherein said bolt passes through a guide opening in said clutch housing and said second limiting element is arranged on a side of the guide opening axially remote from said pressure plate.

9. The friction clutch of claim 8, wherein the ventilating spring system comprises a compression spring clamped between said clutch housing and said second limiting element.

10. The friction clutch of claim 9, wherein said compression spring comprises a set of spring washers.

11. The friction clutch of claim 8, wherein said second limiting element comprises an annular, resilient latching disk surrounding said bolt and having an outer circumference axially engaged between said first and second limiting stops.

12. The friction clutch of claim 11, wherein said bolt comprises a plurality of latching grooves and said latching disk comprises a resilient pawl tooth for engaging one of said plural latching grooves.

13. The friction clutch of claim 8, wherein the second limiting element comprises a clamping sleeve surrounding said bolt in a frictional locked connection and having a radially projecting annular collar engaged axially between said first and second limiting stops.

14. The friction clutch of claim 8, wherein the second limiting element is arranged in a widened section axially adjoining said guide opening in said clutch housing, and said second limiting stop being remote from said pressure plate and comprising a removable retaining ring inserted in said widened section.

15. The friction clutch of claim 1, further comprising a blocking device for blocking an axial expansion of said wear compensation device when an amount of axial spreading of said wear compensation device reaches a predetermined axial compensation travel, said predetermined axial compensation travel comprising a distance that is less than an operationally maximum permissible wear-related change in the combined axial dimensions of said pressure plate, said flywheel, and said friction disk arrangement.

16. The friction clutch of claim 1, wherein said at least one disk comprises a plurality of inner disks in meshed engagement with an external toothing on said hub such that said inner disks are rotationally fixed and axially movable on said hub, wherein said inner disks interact with at least one outer disk in meshed engagement with an internal toothing of said clutch housing such that said outer disk is rotationally fixed and axially movable with respect to said clutch housing.

17. The friction clutch of claim 16, wherein one of said inner disks, said outer disk, and said pressure plate comprises a carbon material.

18. A friction clutch, comprising:
a first clutch unit comprising a flywheel rotatable about an axis of rotation, a clutch housing fixedly connected to said flywheel, a pressure plate mounted in said clutch housing rotatably fixed and axially movable with respect to said clutch housing, and a diaphragm spring operatively arranged between said clutch housing and said pressure plate for pressing said pressure plate toward said flywheel;

a friction disk arrangement clampable between said pressure plate and said flywheel;

a second clutch unit rotatable relative to said first clutch unit about said axis of rotation and comprising a hub connectable to a transmission input shaft and at least one disk of said friction disk arrangement, said hub being rotatably fixed to said at least one disk;

a wear compensation device arranged between said diaphragm spring and said pressure plate such that said diaphragm spring presses said pressure plate toward said flywheel via said wear compensation device;

said wear compensation device comprising first and second compensation elements relatively rotatable relative to each other for expanding an axial length of said wear compensation device to compensate for wear related change in axial dimension of at least one of said pressure plate, said flywheel, and said friction disk arrangement;

said wear compensation device being arranged such that said first compensation element faces said pressure plate and said second compensation element faces said diaphragm spring and said diaphragm spring being movably arranged in said clutch housing such that it is liftable off of said second compensation element;

a compensation distance-limiting stop fixed to said clutch housing for limiting said axial spreading of said first and second compensation elements after the ventilating distance clearance of said ventilating distance-limiting device has been traversed, wherein said second compensation element facing said diaphragm spring is displaceable to a disengaged position abutting said compensation distance-limiting stop on said clutch housing each time said diaphragm spring is lifted off of said second compensation element; and a blocking device for blocking an axial expansion of said wear compensation device when an amount of axial spreading of said wear compensation device reaches a predetermined axial compensation travel, said predetermined axial compensation travel comprising a distance that is less than an operationally maximum permissible wear-related change in the combined axial dimensions of said pressure plate, said flywheel, and said friction disk arrangement.

19. The friction clutch of claim 18, wherein first and second compensation elements comprise first and second rings coaxially arranged with respect to said axis of rotation, a spring connected between said first and second rings urges a relative rotation of said rings about said axis of rotation, said rings comprising a plurality of inclined surfaces distributed circumferentially and sloping in a circumferential direction, said first and second rings being supported against one another axially by said inclined surfaces and are rotatable relative to one another about said axis of rotation by said spring element, and wherein said blocking device comprises stop means for limiting the extent to which said first and second compensation elements spread in the axial direction relative to one another.

20. The friction clutch of claim 19, wherein said stop means comprise at least one pair of stops which lie opposite one another in the circumferential direction of said first and second rings and are assigned to one another and are each fixed relative to one of the rings.

21. The friction clutch of claim 19, wherein said first ring is arranged on one of said pressure plate and said clutch housing, and said diaphragm spring bears against said second ring such that said diaphragm spring is axially liftable off of said second ring, and said stop means comprise at least one stop engaging behind a mating stop mounted on said second ring, wherein said at least one stop is arranged on said one of said pressure plate and said clutch housing.

22. The friction clutch of claim 19, wherein said first and second rings are arranged between said diaphragm spring and said pressure plate in a supporting force path of said diaphragm spring.

23. The friction clutch of claim 18, wherein said friction disk arrangement comprises a plurality of inner disks in meshed engagement with an external toothing on said hub such that said inner disks are rotationally fixed and axially movable on said hub, wherein said inner disks interact with at least one outer disk in meshed engagement with an internal toothing of said clutch housing such that said outer disk is rotationally fixed and axially movable with respect to said clutch housing.

24. The friction clutch of claim 23, wherein one of said inner disks, said outer disk, and said pressure plate comprises a carbon material.

* * * * *